US008521797B2

(12) United States Patent
Hayes

(10) Patent No.: US 8,521,797 B2
(45) Date of Patent: Aug. 27, 2013

(54) SYSTEM AND METHOD TO COMPUTE NARROW BOUNDS ON A MODAL INTERVAL POLYNOMIAL FUNCTION

(75) Inventor: Nathan T. Hayes, Minneapolis, MN (US)

(73) Assignee: Sunfish Studio, LLC, Minneapolis, MN (US)

( * ) Notice: Subject to any disclaimer, the term of this patent is extended or adjusted under 35 U.S.C. 154(b) by 330 days.

(21) Appl. No.: 12/088,368

(22) PCT Filed: Oct. 2, 2006

(86) PCT No.: PCT/US2006/038507
§ 371 (c)(1),
(2), (4) Date: Mar. 27, 2008

(87) PCT Pub. No.: WO2007/041523
PCT Pub. Date: Apr. 12, 2007

(65) Prior Publication Data
US 2008/0256155 A1 Oct. 16, 2008

Related U.S. Application Data

(60) Provisional application No. 60/722,103, filed on Sep. 30, 2005.

(51) Int. Cl.
*G06F 7/38* (2006.01)
(52) U.S. Cl.
USPC .......................................... 708/290; 708/200
(58) Field of Classification Search
USPC .......................................... 708/200–209, 290
See application file for complete search history.

(56) References Cited

U.S. PATENT DOCUMENTS

| 4,760,548 | A | | 7/1988 | Baker et al. | |
| 5,257,355 | A | * | 10/1993 | Akamatsu | 708/290 |
| 5,694,535 | A | * | 12/1997 | Broekhuijsen | 345/442 |
| 5,731,820 | A | * | 3/1998 | Broekhuijsen | 345/442 |
| 6,343,936 | B1 | * | 2/2002 | Kaufman et al. | 434/262 |
| 6,567,831 | B1 | | 5/2003 | Loginov | |
| 6,668,268 | B1 | | 12/2003 | Walster et al. | |
| 6,922,606 | B1 | * | 7/2005 | Yutkowitz | 700/187 |
| 7,385,612 | B1 | * | 6/2008 | Peterson | 345/619 |
| 2004/0075655 | A1 | * | 4/2004 | Dunnett | 345/418 |
| 2005/0073520 | A1 | * | 4/2005 | Papakipos et al. | 345/420 |
| 2005/0251545 | A1 | | 11/2005 | Goldwasser et al. | |
| 2005/0283516 | A1 | * | 12/2005 | Fenney | 708/495 |
| 2006/0044312 | A1 | * | 3/2006 | Loop | 345/443 |

OTHER PUBLICATIONS

Bernadette et al., From Interval Computations to Modal Mathematics: Applications and Computational Complexity, 1998, IEEE issue 124, pp. 7-11.*

(Continued)

*Primary Examiner* — Michael D Yaary
(74) *Attorney, Agent, or Firm* — Nawrocki, Rooney & Sivertson, P.A.

(57) ABSTRACT

A computer executable method of processing a representation of a modal interval polynomial is provided. A representation of a modal interval polynomial is generally provided as input, more particularly, a representation comprising a modal interval function variable and an array of modal interval coefficients. Each modal interval linear interpolation of each of the modal interval coefficients of the array are recursively processed until a single modal interval coefficient remains in the array. For each iteration of the recursive processing, a modal interval linear interpolation operation is executed.

13 Claims, 14 Drawing Sheets

PRESENT INVENTION:
MODAL INTERVAL BEZIER CURVE

(56) References Cited

OTHER PUBLICATIONS

Meng-Ai An, PCT International Search Report and Written Opinion of the International Searching Authority, PCT Application No. PCT/US06/38507, Jun. 26, 2007.

Meng-Ai An, PCT International Preliminary Report on Patentability of the International Preliminary Examining Authority, PCT Application No. PCT/US06/38507, Dec. 21, 2007.

Hansen, Eldon R. and Walster, G. William, Sharp Bounds on Interval Polynomial Roots, Reliable Computing 8, 2002, pp. 115-122, Kluwer Academic Publishers, Netherlands.

Stahl, Volker, Interval Methods for Bounding the Range of Polynomials and Solving Systems of Nonlinear Equations, Johannes Kepler University, Sep. 1995, pp. i-272.

Sederberg, Thomas W. and Farouki, Rita T., Approximation by Interval Bezier Curves, IEEE Computer Graphics & Applications, Sep. 1992, pp. 87-95.

Graillat, S., Langlois, PH., and Louvet, N., Compensated Horner Scheme, Universite de Perpignan Via Domitia, Research Report No. RR2005-04, 2005, pp. 1-25.

Gardenes, Ernest, Sainz, Miguel A., Jorba, Lambert, Calm, Remei, Estela, Rosa, Mielgo, Honorino and Trepat, Albert, Modal Intevals, Reliable Computing 7, 2001, pp. 77-111, Kluwer Academic Publishers, Netherlands.

\* cited by examiner

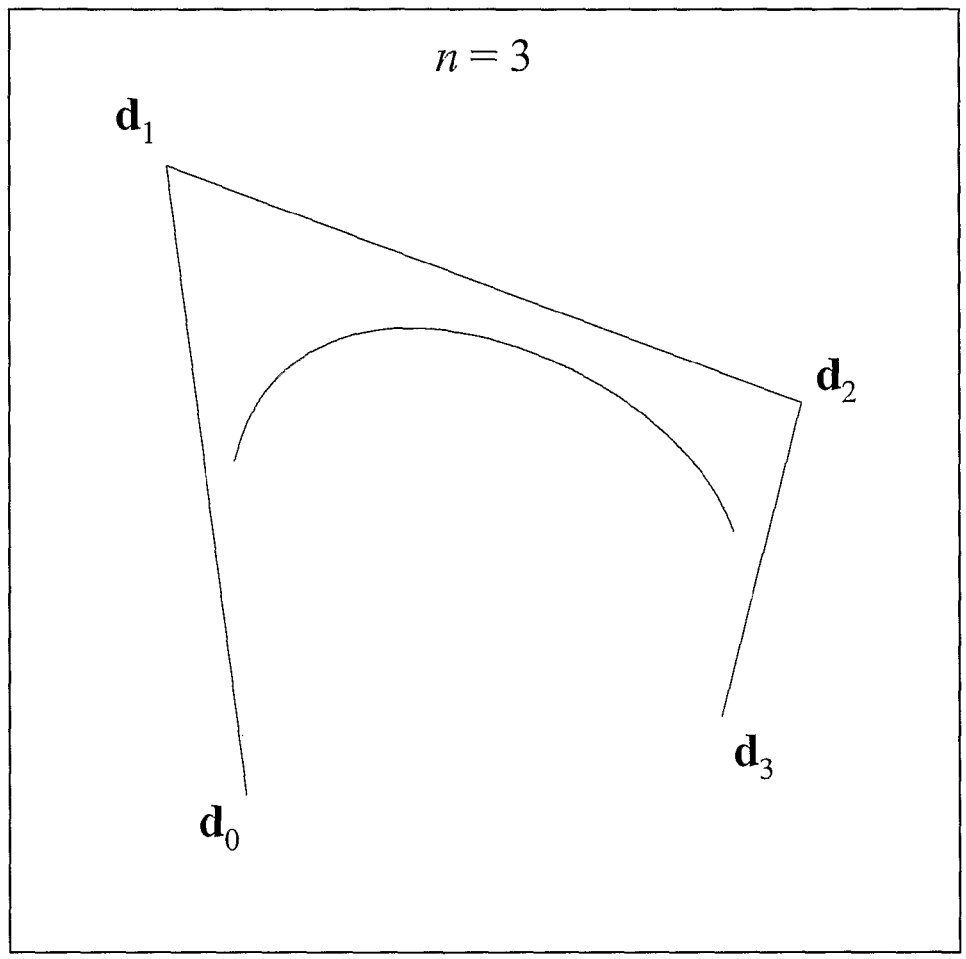
FIG. 3

PRIOR ART:
LINEAR INTERPOLATION OF A B-SPLINE CURVE
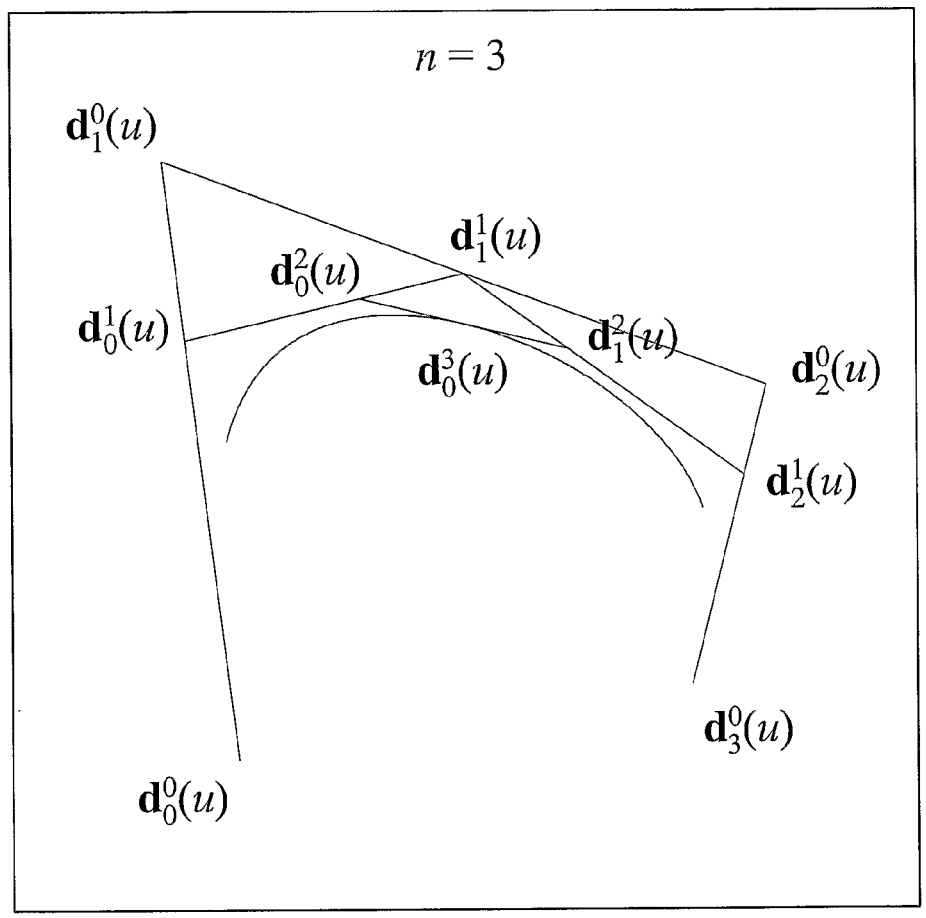
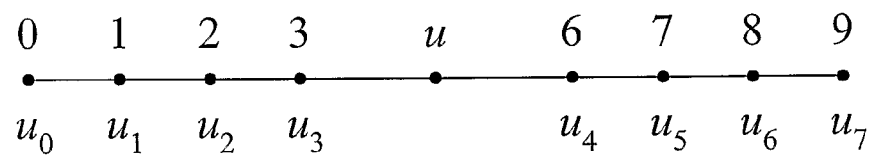
FIG. 4

**PRIOR ART:
APPROXIMATION BY INTERVAL BEZIER CURVE
(SEDERBERG AND FAROUKI, 1992)**
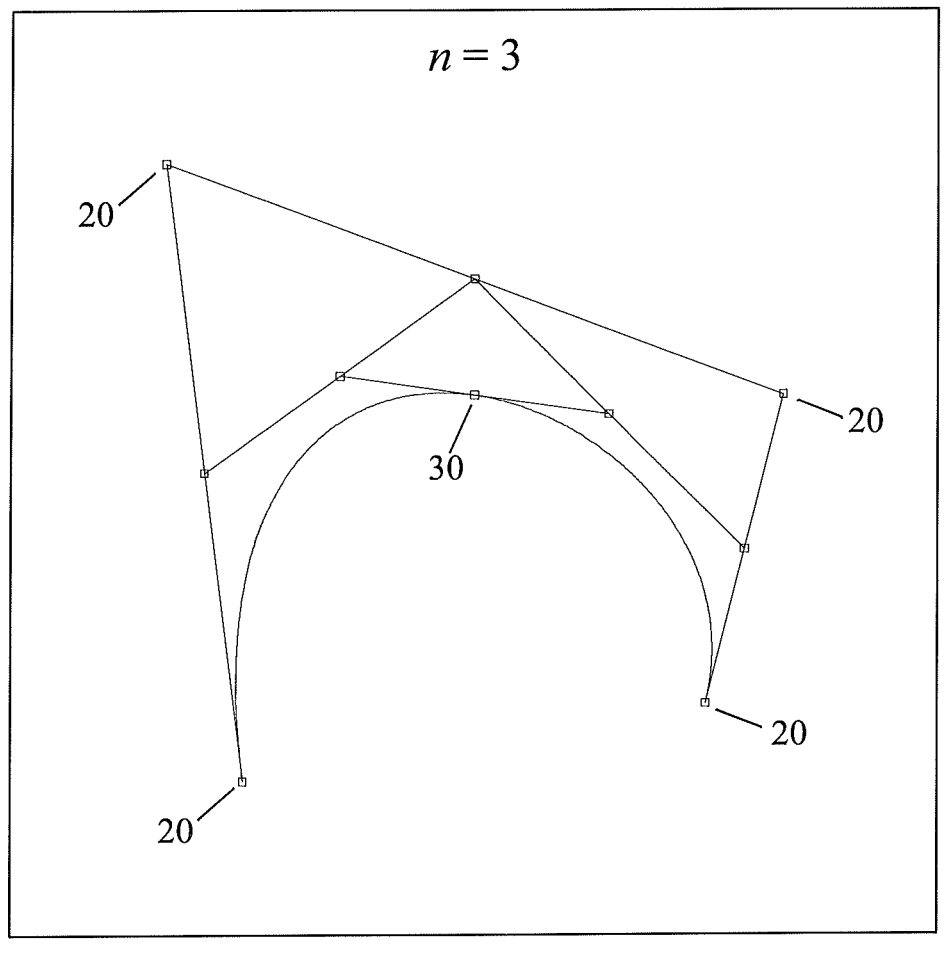
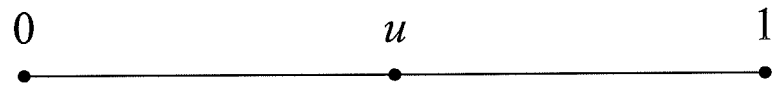
FIG. 5

PRESENT INVENTION:
MODAL INTERVAL BEZIER CURVE
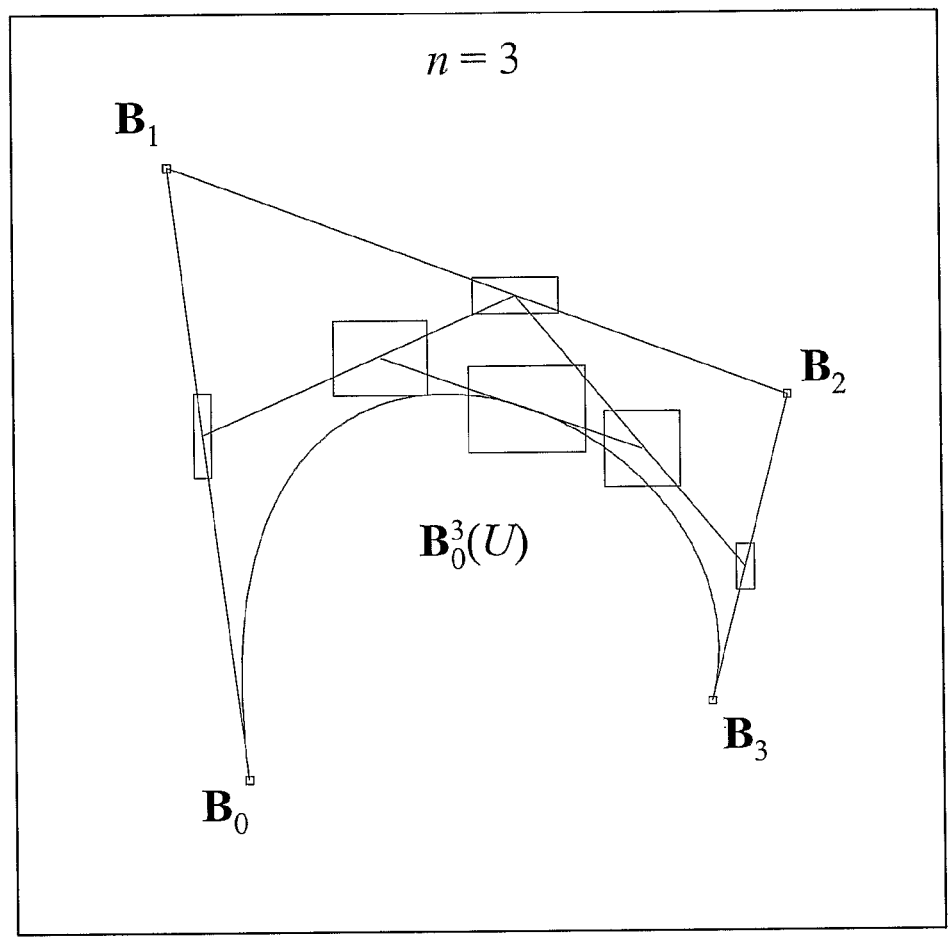
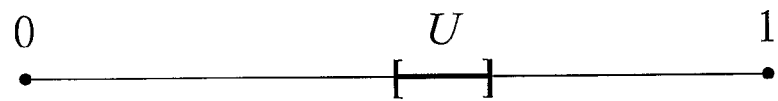
FIG. 6

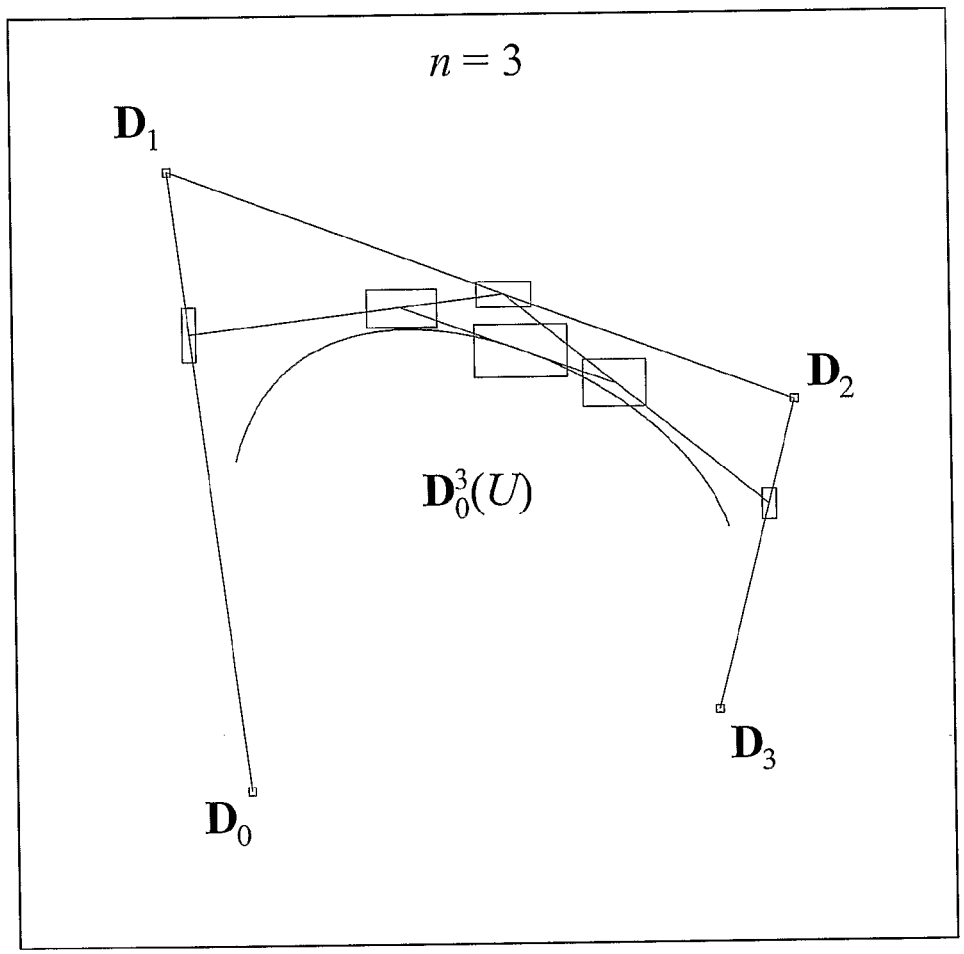
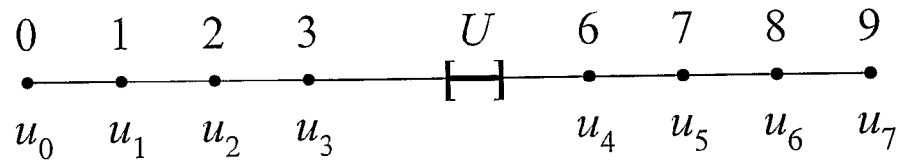
FIG. 7

| bezier(<br>  inout: B[],<br>  in: U,<br>  in: n ) | *Array of modal interval control points*<br>*Modal interval function variable*<br>*Degree of the curve* |
|---|---|
| ```
for r ← 1 to n
  for i ← 0 to n - r
    B[i] ← B[i] + U * ( B[i+1] - Dual( B[i] ) )
  end
end
``` | |

| bspline(<br>  inout: D[],<br>  in: u[],<br>  in: U,<br>  in: n ) | *Array of modal interval control points*<br>*Array of scalar knot values*<br>*Modal interval function variable*<br>*Degree of the curve* |
|---|---|
| ```
for r ← 1 to n
  a ← r
  b ← n
  for i ← 0 to n - r
    b ← b + 1
    alpha ← ( U - u[a] ) / ( u[b] - u[a] )
    D[i] ← D[i] + alpha * ( D[i+1] - Dual( D[i] ) )
    a ← a + 1
  end
end
``` | |

| triangle(<br>  inout: B[],<br>  in: U,<br>  in: V,<br>  in: n ) | *Array of modal interval control points*<br>*Modal interval function variable*<br>*Modal interval function variable*<br>*Degree of the surface* |
|---|---|
| ```
for r ← 1 to n
  a ← 0
  for i ← 0 to n - r
    b ← a + i
    c ← b + 1
    for j ← 0 to i
      b ← b + 1
      c ← c + 1
      B[a] ← B[a] +
        U * ( B[b] - Dual( B[a] ) ) +
        V * ( B[c] - Dual( B[a] ) )
      a ← a + 1
    end
  end
end
``` | |

FIG. 11

PRIOR ART:
SUBDIVISION OF A SET-THEORETICAL
INTERVAL BEZIER CURVE
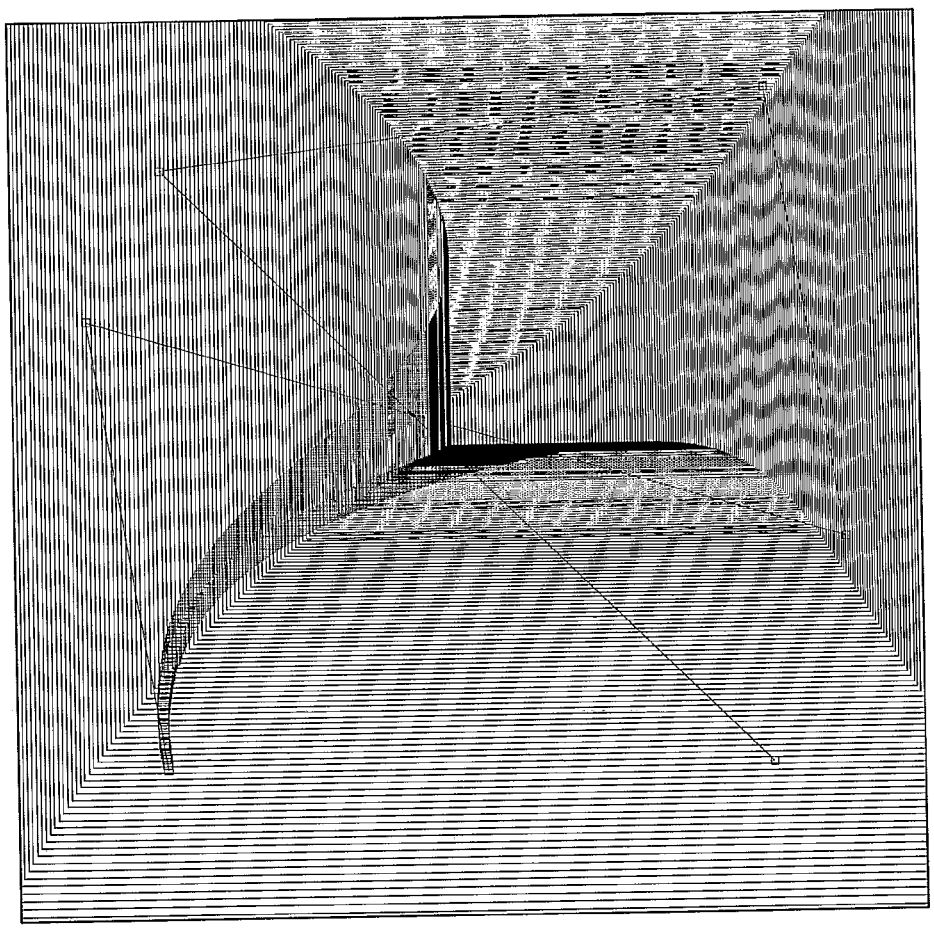
0                                                               1
FIG. 13

**PRESENT INVENTION:
SUBDIVISION OF A MODAL INTERVAL BEZIER CURVE**

SYSTEM AND METHOD TO COMPUTE NARROW BOUNDS ON A MODAL INTERVAL POLYNOMIAL FUNCTION

This is an international application filed under 35 USC §363 claiming priority under 35 U.S.C. §119(e) (1), of U.S. provisional application Ser. No. 60/722,103 having a filing date of Sep. 30, 2005 and incorporated herein by reference in its entirety.

TECHNICAL FIELD

The present invention relates to performing arithmetic operations on modal intervals within a computer, more particularly, the present invention relates to a system and method to assess and compute narrow bounds on a modal interval polynomial function.

BACKGROUND OF THE INVENTION

A polynomial is a mathematical function involving the sum of powers of a function variable, x, multiplied by coefficients $a_0, a_1, a_2, \ldots, a_n$. A polynomial has the general analytic form $$f(x) = a_n x^n + \ldots + a_2 x^2 + a_1 x + a_0.$$

The degree of a polynomial is the number n characterizing the largest power of the polynomial.

The ratio of two polynomial functions is called a rational function. If f(x) and g(x) are two polynomial functions, then $$h(x) = \frac{f(x)}{g(x)}$$

is a rational function.

Polynomial and rational functions are the only class of mathematical functions that can be evaluated by performing a finite number of arithmetical operations. As a consequence, they are the essential, fundamental and indispensable building blocks of numerical analysis.

As an example, transcendental functions, which include the exponential, logarithmic and trigonometric functions, are typically evaluated inside a computer in terms of polynomial and rational approximations. Such a methodology is the basis for the implementation of transcendental functions in modern microprocessors such as the Intel Pentium and AMD Opteron. The text "Elementary Functions: Algorithms and Implementation, $2^{nd}$ Edition," Muller, Jean-Michel, Birkhauser, 2006 describes how to use polynomial and rational approximations to compute transcendental functions in a computer, and it is incorporated herein by reference.

The most efficient method to evaluate a polynomial function is by using Horner's rule, which factors out powers of x, giving $$f(x) = ((a_n x + a_{n-1})x + \ldots)x + a_0.$$

This method minimizes the number of arithmetical operations and results in less numerical instability than a more naïve computational approach.

Although Horner's rule is the most computationally efficient method to evaluate a polynomial function, it has several disadvantages. Namely, the coefficients of the polynomial have little geometric relation to the shape of the curve, and the method is not numerically stable if the coefficients vary greatly in magnitude.

Popular and ubiquitous applications such as desktop publishing, computer graphics, and Computer Aided Design (CAD) put the focus on interactive shape design, that is, the emphasis of the polynomial computations are geometric in nature. This is in contrast to the "algebraic flavor" of Horner's rule and the analytic form of a polynomial as previously presented.

For these reasons, alternative computational methods for polynomials were developed in the 1960's. These innovations were due largely to competition in the automotive industry, occurring over a period of time when the availability of computers and CAD software was replacing traditional paper and pencil design methods.

The breakthrough insight was to use control polygons, a technique that was never used before. The polynomial is defined such that the coefficients are the control points of a control polygon. This innovation greatly facilitates interactive shape design, as changes to the control polygon cause the polynomial curve to follow in a very intuitive way.

Pierre Bezier was the first to publish a mathematical formulation for a polynomial curve which uses the control polygon concept. To this day, such polynomial forms are known simply as "Bezier curves."

Paul de Casteljau discovered a computational method similar to Horner's rule that evaluates points on a Bezier curve. Known today as the "de Casteljau method," a point on a Bezier curve is computed by a recursive process of linear interpolation of control points of the control polygon of the Bezier curve.

Last but not least, C. de Boor generalized the de Casteljau method, applying it to the B-spline form of a polynomial and demonstrating that the B-spline is a generalization of the Bezier curve. Known today as the "de Boor method," a point on a B-spline curve is computed by a recursive process of linear interpolation of control points of the control polygon of the B-spline curve.

As a result, any polynomial can be represented exactly as a Bezier or a B-spline curve. Any rational function can likewise be represented exactly as the ratio of two Bezier or B-spline curves. Formulas to convert the polynomial coefficients to and from Bezier and B-spline form are well known in the art.

Rational functions which are the ratio of two B-spline curves are referred to in the art as NURBS, that is, a Non-Uniform Rational B-Spline. NURBS enjoy "most favored" status in the CAD industry due to their generality and flexibility.

From a computational perspective, the de Casteljau method for evaluating points on a Bezier curve is only slightly more expensive than Horner's rule, but the de Casteljau method is more numerically stable. These qualities, as well as their geometric nature, are the main reason why the Bezier curve and the de Casteljau method are so common and ubiquitous in geometric applications such as desktop publishing, computer graphics and CAD.

The de Boor method for evaluating points on a B-spline curve shares all the positive qualities and benefits of the de Casteljau method, with the additional benefit of increased generality. The de Boor method accounts for the ubiquitous popularity of NURBS in high-end CAD and computer animation applications.

The present invention is specifically concerned with the evaluation of interval polynomials, that is, a polynomial in which the function variable and coefficients are all intervals. More to the point, the interval Bezier and interval B-spline forms of a polynomial are considered.

The common and popular notion of interval arithmetic is based on the fundamental premise that intervals are sets of numbers and that arithmetic operations can be performed on these sets. Such interpretation of interval arithmetic was initially advanced by Ramon Moore in 1957, and has been recently promoted and developed by interval researchers such as Eldon Hansen, William Walster, Guy Steele and Luc Jaulin. This is the so-called "classical" interval arithmetic, and it is purely set-theoretical in nature.

A set-theoretical interval is a compact set of real numbers [a,b] such that $a \leq b$. The classical interval arithmetic operations of addition, subtraction, multiplication and division combine two interval operands to produce an interval result such that every arithmetical combination of numbers belonging to the operands is contained in the interval result. This leads to programming formulas made famous by classical interval analysis, and which are discussed at length in the interval literature.

The application of interval arithmetic to the efficient evaluation of polynomial functions is not straightforward. In fact, it is fraught with many difficult problems and challenges.

Interval dependence is a phenomenon that occurs when an interval variable appears more than once in a mathematical expression. As is well-known by the interval community, interval dependence in a mathematical expression creates a pessimistic result, that is, the result contains excessive interval width. Even worse, pessimism caused by multiple occurrences of an interval variable in an expression is cumulative, that is, pessimism grows as the number of instances of an interval variable in an expression increases.

For an interval polynomial function, that is, a polynomial function where the function variable and coefficients are all intervals, dependence quickly becomes a source of dramatic pessimism. This is due to the number of instances of the function variable, which increase with the degree of the polynomial. The result is an explosive growth of interval dependence and pessimism.

Even the application of Horner's rule, the de Casteljau method, or the de Boor method to an interval polynomial expression does not solve the problem. In all cases, the number of instances of the function variable continues to increase with the degree of the polynomial, and so does the pessimism. As a consequence, it is a widely held belief that interval polynomial functions require expensive "divide and conquer" methods to obtain non-pessimistic results, and a great deal of effort has been dedicated to overcoming pessimism in an interval polynomial function by using such techniques.

The article "Sharp Bounds on Interval Polynomial Roots," Hansen, E. R. and W. G. Walster, Reliable Computing 8.2, Springer Netherlands, 2002, pp. 115-122 is an example which describes a sophisticated method for computing roots of interval polynomial functions. In the PhD dissertation "Interval Methods for Bounding the Range of Polynomials and Solving Systems of Nonlinear Equations," Stahl, Volker, Johannes Kepler University, Austria, 1995, the author uses recursive bisection methods in conjunction with a host of ancillary contraction or "tightening" methods to reduce pessimism. Both publications are incorporated herein by reference.

The prior art also includes "pseudo-interval" methods involving polynomial functions. The article "Approximation by Interval Bezier Curves," Sederberg, T. W. and Farouki, R. T., IEEE Computer Graphics and Applications 12.5, 1992, pp. 87-95 is one such example, and is incorporated herein by reference. A similar example is the paper "Compensated Horner Scheme," Graillat, S., et. al., Research Report No. RR2005-04, Universite de Perpignan Via Domitia, 2005, which is also incorporated herein by reference.

These so-called "pseudo-interval" methods evaluate an interval result for a polynomial only in the special case of when the function variable is not an interval. In this case, there is less opportunity for dependence to occur, and this makes computing non-pessimistic results quite a bit "easier." At the same time, because such methods require that the function variable must not be an interval, they are unsuitable for use in true interval analysis problems where the function variable is almost always an interval. Such an example is the interval rendering system and method described in applicant's publication WO 2004/046881 entitled VISIBLE SURFACE DETERMINATION SYSTEM & METHODOLOGY IN COMPUTER GRAPHICS USING INTERVAL ANALYSIS, which is incorporated herein by reference.

In 2001, Miguel Sainz and other members of the SIGLA/X group at the University of Girona, Spain, introduced a new branch of interval mathematics known as "modal intervals." Unlike the classical view of an interval as a compact set of real numbers, the new modal mathematics considers an interval to be a quantified set of real numbers.

As a practical consequence, a modal interval is comprised of a binary quantifier and a set-theoretical interval. In the modal interval literature, an apostrophe is used to distinguish a set-theoretical interval from a modal interval, so if Q is a quantifier and X' is a purely set-theoretical interval, then X=(Q, X') is a modal interval. For this reason, it is easy to see that modal intervals are a true superset of the classical set-theoretical intervals. At the same time, the quantified nature of a modal interval provides an extra dimension of symmetry not present in the classical set-theoretical framework.

This difference allows the modal intervals to solve problems out of the reach of their classical counterparts. Just as the real expression 3+x=0 has no meaning without negative numbers, it can be shown that the interval expression [1,2]+X=[0, 0] has no meaning without quantified (i.e., modal) intervals.

The quantified nature of a modal interval comes from predicate logic, and the value of a quantifier may be one of the fundamental constructions $\exists$ or $\forall$, that is, "existential" or "universal." The symbols 3 or V are commonly read or interpreted as "there exists" and "for all," respectively.

The article "Modal Intervals," M. Sainz, et. al., Reliable Computing, Vol. 7.2, 2001, pp. 77-111, provides an in-depth introduction to the notion of modal intervals, how they differ from the classical set-theoretical intervals, and upon what mathematical framework they operate; the article is also incorporated herein by reference.

In light of the shortcomings of heretofore known numerical methods, techniques and approaches generally, and the aforementioned inherent challenges with polynomial representations, there remains an unmet need for novel computational systems and methods. More particularly, with the work of Sainz et al. as a backdrop, it remains particularly advantageous to provide a computational system and method for a polynomial where the function variable and coefficients are all modal intervals.

SUMMARY OF THE INVENTION

The present invention advantageously provides and/or includes a Polynomial Computation Unit (PCU). The PCU is a hardware circuit for processing a representation of a modal interval polynomial function.

The PCU receives a representation of a modal interval polynomial comprised of a modal interval function variable and an array of modal interval coefficients. The PCU then evaluates the polynomial by a recursive process of modal interval linear interpolation of the coefficients and returns a modal interval result.

The PCU works in conjunction with a modal interval processor, as described in applicant's pending international application ser. no. PCT/US06/12547 filed Apr. 5, 2006 entitled MODAL INTERVAL PROCESSOR, and incorporated herein by reference. During the computational process of each modal interval linear interpolation, the PCU uses the modal interval processor to perform arithmetical operations on representations of modal intervals.

The PCU and the modal interval processor both use a representation of modal intervals within a computer as described in applicant's copending international application ser. nos. PCT/US06/38579 & PCT/US06/38578, each filed Oct. 2, 2006 entitled REPRESENTATION OF MODAL INTERVALS WITHIN A COMPUTER and RELIABLE AND EFFICIENT COMPUTATION OF MODAL INTERVAL ARITHMETIC OPERATIONS respectively, each of which being incorporated herein by reference.

In another embodiment of the present invention, special instruction is provided to a floating-point processor, thereby emulating the aforementioned function of the PCU.

The novelty of the present invention is premised upon, among other things: it is believed to be the only method to address and describe a recursive process of a modal interval linear interpolation to compute narrow bounds on an interval polynomial in which the function variable and coefficients are all intervals; via the use of a modal interval linear interpolation, the present invention is able to compute non-pessimistic results, that is, the subject method and/or system defeats pessimism associated with the interval arithmetic by using a modal interval analysis; and, a practical computational system is given for the method, that is, an embodiment of the method into a hardware circuit, or a software emulation thereof, is likewise provided.

BRIEF DESCRIPTION OF THE DRAWINGS

FIG. 3 depicts a B-spline curve and its constituent parts;

FIG. 4 depicts computation of a point on a B-spline curve via a recursive process of linear interpolation of control points;

FIG. 5 depicts an approximation by interval Bezier curve in the prior art (Sederberg and Farouki, 1992);

FIG. 6 depicts a modal interval Bezier curve as computed by the present invention;

FIG. 7 depicts a modal interval B-spline curve as computed by the present invention;

FIG. 11 represents pseudo-code listings of software programs emulating various embodiments of the PCU;

FIG. 13 represents a subdivision of a set-theoretical interval Bezier curve using methods available in the prior art; and, FIG. 14 represents a subdivision of a modal interval Bezier curve using the system and method of the present invention.

DETAILED DESCRIPTION OF THE INVENTION

As a preliminary matter, prior to a presentation of the particulars of the subject invention, a discussion of the nature of the polynomials underlying the subject methodology is provided.

Bezier Curves

Figure 1:
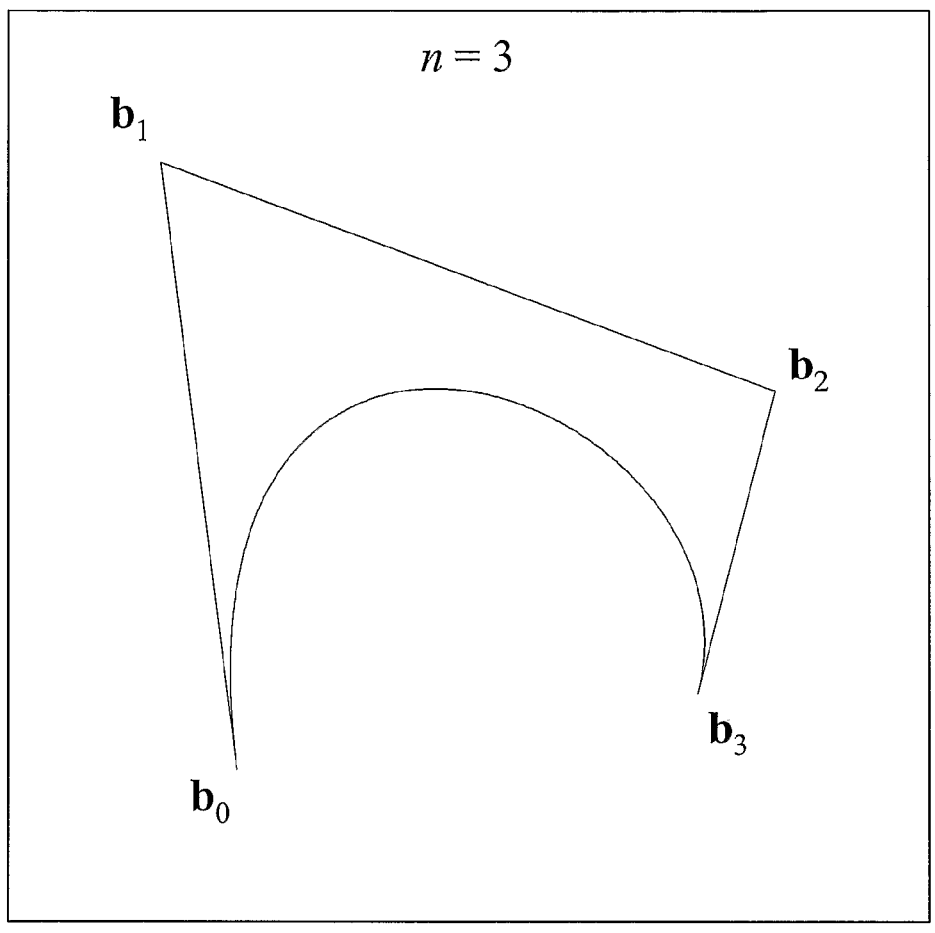
FIG. 1 depicts a Bezier curve and its constituent parts.

FIG. 1 shows a Bezier curve, which is a polynomial parameterized by a control polygon. The control polygon of an nth-degree Bezier curve is comprised of n+1 control points, $b_0, b_1, b_2, \ldots, b_n$. The set of control points may be comprised of scalars or vectors. The curve is further parameterized by a scalar function variable u such that $0 \leq u \leq 1$.

Figure 2:
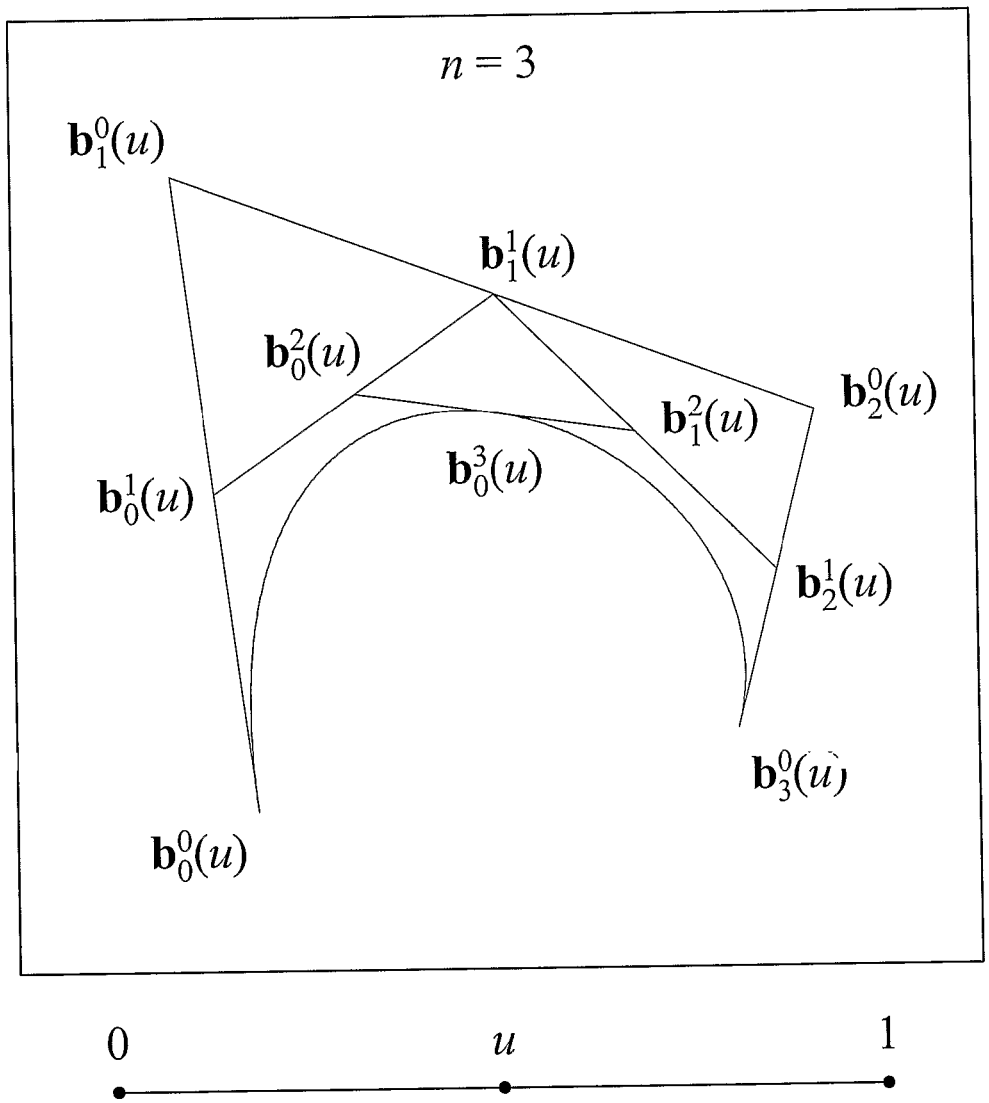
FIG. 2 depicts computation of a point on a Bezier curve via a recursive process of linear interpolation of control points.

FIG. 2 shows that a point on a Bezier curve is computed by a recursive process of linear interpolation of control points of the control polygon. Each linear interpolation of the recursive process is a function of u, namely $$b_i^r(u) = (1-u) \cdot b_i^{r-1}(u) + u \cdot b_{i+1}^{r-1}(u) \begin{cases} r = 1, \ldots, n \\ i = 0, \ldots, n-r \\ b_i^0(u) = b_i \end{cases}.$$

For any parameter value of u, evaluating $b_0^n(u)$ computes a point on the Bezier curve.

B-Splines

FIG. 3 shows a B-spline curve, which is a polynomial parameterized by a control polygon and a knot vector. The control polygon of an nth-degree B-spline is comprised of m=n+1 control points, $d_0, d_1, d_2, \ldots, d_n$. As in the case of a Bezier curve, the set of control points may be scalars or vectors. The knot vector is comprised of a non-decreasing sequence of k=2m scalars, $u_0, u_1, u_2, \ldots, u_{k-1}$, called knots, such that $u_n \neq u_m$. The curve is further parameterized by a scalar function variable u such that $u_n \leq u \leq u_m$.

FIG. 4 shows that a point on a B-spline is computed by a recursive process of linear interpolation of control points of the control polygon. Each linear interpolation of the recursive process is a function of u, namely $$d_i^r(u) = (1-\alpha) \cdot d_i^{r-1}(u) + \alpha \cdot d_{i+1}^{r-1}(u) \begin{cases} r = 1, \ldots, n \\ i = 0, \ldots, n-r \\ d_i^0(u) = d_i \end{cases}.$$

The interpolation variable $\alpha$ is a function of u and the knots $$\alpha = \frac{u - u_{i+r}}{u_{i+n+1} - u_{i+r}}.$$

For any parameter value of u, evaluating $d_0^n(u)$ computes a point on the B-spline.

As can be seen, the B-spline is a generalization of the Bezier curve. In the case that knots $u_0 \ldots u_n$ are equal and that knots $u_m \ldots u_{k-1}$ are equal, the B-spline is mathematically equivalent to a Bezier curve. For example, if n=3 and the knot vector is {0, 0, 0, 0, 1, 1, 1, 1}, the B-spline is a Bezier curve. For this reason, a B-spline is a generalization of a Bezier curve.

Interval Dependence

The present invention is specifically concerned with interval curves, that is, Bezier or B-spline curves in which the function variable and control points are all intervals.

A simple but naïve approach is to perform the previously described computations directly on the interval operands, that is, to substitute all non-interval arguments with their respective interval counterparts and then perform the same computational operations. This will produce a correct interval result, but it will also be hopelessly pessimistic. Even for curves of low degree, the pessimism will be severe, but as the degree of the curve increases, the pessimism will quickly explode into astronomical magnitudes, making the interval result unacceptable and worthless for almost all practical applications.

The source of pessimism is in the interval dependence that occurs in each linear interpolation of control points. For example, given two interval values, A and B, and an interval interpolation variable $U \subseteq [0,1]$, the interval expression of a linear interpolation between A and B is $$L(U)=(1-U) \cdot A + U \cdot B.$$

In this case, the interval variable U occurs twice in the expression and this causes interval dependence to occur in the computation.

As an example, if A=[1,2] and B=[5,7], a linear interpolation by the interval variable U=[0.2,0.3] produces the result $$(1 - [.2,.3]) \cdot [1,2] + [.2,.3] \cdot [5,7] = [1.7, 3.7].$$

Similarly, the expression of the linear interpolation can be rearranged into the form $$L'(U) = A + U \cdot (B-A).$$

In this case, the interval variable U only appears once in the expression, but A now appears twice. Using the same interval values to compute this form of the linear interpolation produces the result $$[1,2] + [.2,.3] \cdot ([5,7] - [1,2]) = [1.6, 3.8].$$

The answer [1.6,3.8] is not equal to the original result, [1.7, 3.7]. This is a demonstration of interval dependence in action. Even though L(U) and L'(U) are mathematically equivalent, each yields a different computational result. It appears that L(U) produces a narrower (better) result, but it is actually the case that [1.7,3.7] is still pessimistic due to the multiple occurrences of U in L(U).

But the demonstration so far is not the worst of the problem, because the pessimism caused by the interval dependence is cumulative. As the number of linear interpolations increases with the degree of the curve, the pessimism likewise propagates through the computation, causing a cumulative growth in the pessimism. Even for a Bezier or B-spline curve with n=3, the cumulative effect of interval dependence is devastating. In such a case, the pessimism in the final result is often greater than an order of magnitude.

For the reasons described, it is a widely held belief by interval experts that evaluating an interval curve by a recursive process of linear interpolation of control points is perhaps the worst possible method to accomplish the goal of computing a narrow interval result. Instead, expensive "divide and conquer" or restrictive "pseudo-interval" methods are used to obtain non-pessimistic results.

In regards to "divide and conquer" methods, the previously cited references of Walster and Stahl are examples of common techniques in the prior art which use recursive bisection, endpoint analysis, interval "tightening" methods, or a combination thereof. Such methods generally require special knowledge of the polynomial function and often involve computation of derivatives. When the full arsenal of such methods is employed, pessimism can often be defeated, but typically at a great computational expense. The prospect of embedding such complex and dynamic methods into a simple hardware circuit seem far-fetched.

By contrast, the so-called "pseudo-interval" methods of the prior art provide simple and elegant ways to defeat pessimism, but only by restricting the types of interval polynomial functions which can be solved.

FIG. 5 is a depiction of a method described in the previously referenced article entitled "Approximation by Interval Bezier Curves" by Sederberg and Farouki. This approximation method allows the control points of the Bezier curve to be intervals. In this regard, each interval control point 20 represents a certain amount of uncertainty or approximation error. For any point u in the parameter domain, a sequence of linear interpolations of interval control points result in an interval box 30 which characterizes the approximation error of the curve evaluated at point u.

The shortcoming of this and other "pseudo-interval" methods is that u must be a point, that is, it is not possible to evaluate the interval Bezier curve over an interval domain $[u_1, u_2]$. As a result, there is less opportunity for dependence to occur, and this makes computing non-pessimistic results quite a bit "easier." At the same time, because such methods require that u must not be an interval, they are unsuitable for use in true interval analysis problems where u is almost always an interval $[u_1, u_2]$. Such an example is the interval rendering system and method described in applicant's publication WO 2004/046881 entitled VISIBLE SURFACE DETERMINATION SYSTEM & METHODOLOGY IN COMPUTER GRAPHICS USING INTERVAL ANALYSIS, which is incorporated herein by reference.

Modal Interval Interpolation

As described previously, it is a widely held belief by interval experts that evaluating an interval curve by a recursive process of linear interpolation of control points is perhaps the worst possible method to accomplish the goal of computing a narrow interval result.

The present invention introduces a novel method to solve this problem and to show that this widely held belief is false. The solution is reached by turning the entire problem into a modal interval expression and then performing a modal analysis, which in turn facilitates the embodiment of a practical computational system and method within a computer.

As described previously, a modal interval X=(Q, X') is a quantified set of real numbers. In the modal interval literature, an apostrophe is used to distinguish a set-theoretical interval X' from a modal interval X. The quantified nature of modal intervals comes from predicate logic, and the value of the quantifier Q may be one of the fundamental constructions ∃ for "existential" or ∀ for "universal." A more compact notation for a modal interval is Q(x,X'), where x is a quantified real variable such that x belongs to X' and is quantified by Q. In this case, Q uses the friendlier notation of E and U, respectively, for "existential" and "universal."

In order to perform a modal analysis, the entire problem must be turned into a modal interval expression. Due to the quantified nature of the modal mathematics, each argument of the expression must be quantified. In the case of linear interpolation as previously discussed, the modal interval arguments A, B and U are existential. In accordance with the modal interval theorem of "coercion to optimality," the modal interval linear interpolation becomes $$U(a,A')U(b,B')U(u,U')E(x,X')$$

$$X = A + U \cdot (B - \text{Dual}(A)).$$

This expression is optimal, that is, it has no interval dependence. As a consequence, there is no pessimism in the computational result.

The optimality of the modal interval linear interpolation cannot be overemphasized; it is a total defeat of the interval dependence discussed in the previous section. As an example, using the same values as before produces the result $$[1,2] + [.2,.3] \cdot ([5,7] - \text{Dual}([1,2])) = [1.8,3.5].$$

The answer [1.8,3.5] is narrower than any of the previous examples due to the fact that the modal interval expression is optimal, and so there is no pessimism in the result.

It is also an important observation to notice that the result of the modal interval linear interpolation is existential. In other words, X has the same modality as A and B. It is precisely for this reason that X can then be used as input to subsequent linear interpolation of control points of a Bezier or B-spline control polygon.

Modal Interval Bezier Curves

FIG. 6 shows a modal interval Bezier curve, which is a modal interval polynomial parameterized by a control polygon. The control polygon of an nth-degree modal interval Bezier curve is comprised of n+1 control points, $B_0$, $B_1$, $B_2$, ..., $B_n$. The set of control points may be comprised of modal intervals or modal interval vectors, but all elements are existential. The curve is further parameterized by an existential modal interval function variable U such that $U \subseteq [0,1]$.

FIG. 6 further shows that a bound on a modal interval Bezier curve is computed by a recursive process of modal interval linear interpolation of control points of the control polygon. Each linear interpolation of the recursive process is a function of U, namely $$B_i^r(U) = B_i^{r-1}(U) + U \cdot (B_{i+1}^{r-1}(U) - \text{Dual}(B_i^{r-1}(U))) \begin{cases} r = 1, \ldots, n \\ i = 0, \ldots, n-r \\ B_i^0(U) = B_i \end{cases}.$$

For any parameter value of U, evaluating $B_0^n(U)$ computes a bound on the modal interval Bezier curve.

Modal Interval B-Splines

FIG. 7 shows a modal interval B-spline curve, which is a modal interval polynomial parameterized by a control polygon and a knot vector. The control polygon of an nth-degree modal interval B-spline is comprised of m=n+1 control points, $D_0$, $D_1$, $D_2$, ..., $D_n$. As in the case of a modal interval Bezier curve, the set of control points may be modal intervals or modal interval vectors, but all elements are existential. The knot vector is comprised of a non-decreasing sequence of k=2m scalars, $u_0$, $u_1$, $u_2$, ..., $u_{k-1}$, called knots, such that $u_n \neq u_m$. The curve is further parameterized by an existential modal interval function variable U such that $U \subseteq [u_n, u_m]$.

FIG. 7 further shows that a bound on a modal interval B-Spline is computed by a recursive process of modal interval linear interpolation of control points of the control polygon. Each linear interpolation of the recursive process is a function of U, namely $$D_i^r(U) = D_i^{r-1}(U) + \alpha \cdot (D_{i+1}^{r-1}(U) - \text{Dual}(D_i^{r-1}(U))) \begin{cases} r = 1, \ldots, n \\ i = 0, \ldots, n-r \\ D_i^0(U) = D_i \end{cases}.$$

The modal interval variable α is a function of U and the knots $$\alpha = \frac{U - u_{i+r}}{u_{i+n+1} - u_{i+r}}.$$

For any parameter value of U, evaluating $D_0^n(U)$ computes a bound on the modal interval B-spline. The subject formulas for modal interval Bezier and B-spline curves are novel, and they are the foundation upon which all embodiments of the present invention are implemented.

Polynomial Computation Unit (PCU)

As previously noted, the present invention advantageously includes a Polynomial Computation Unit (PCU). The PCU is a hardware circuit for processing a representation of a modal interval polynomial function, namely a modal interval Bezier or B-spline.

Figure 8:
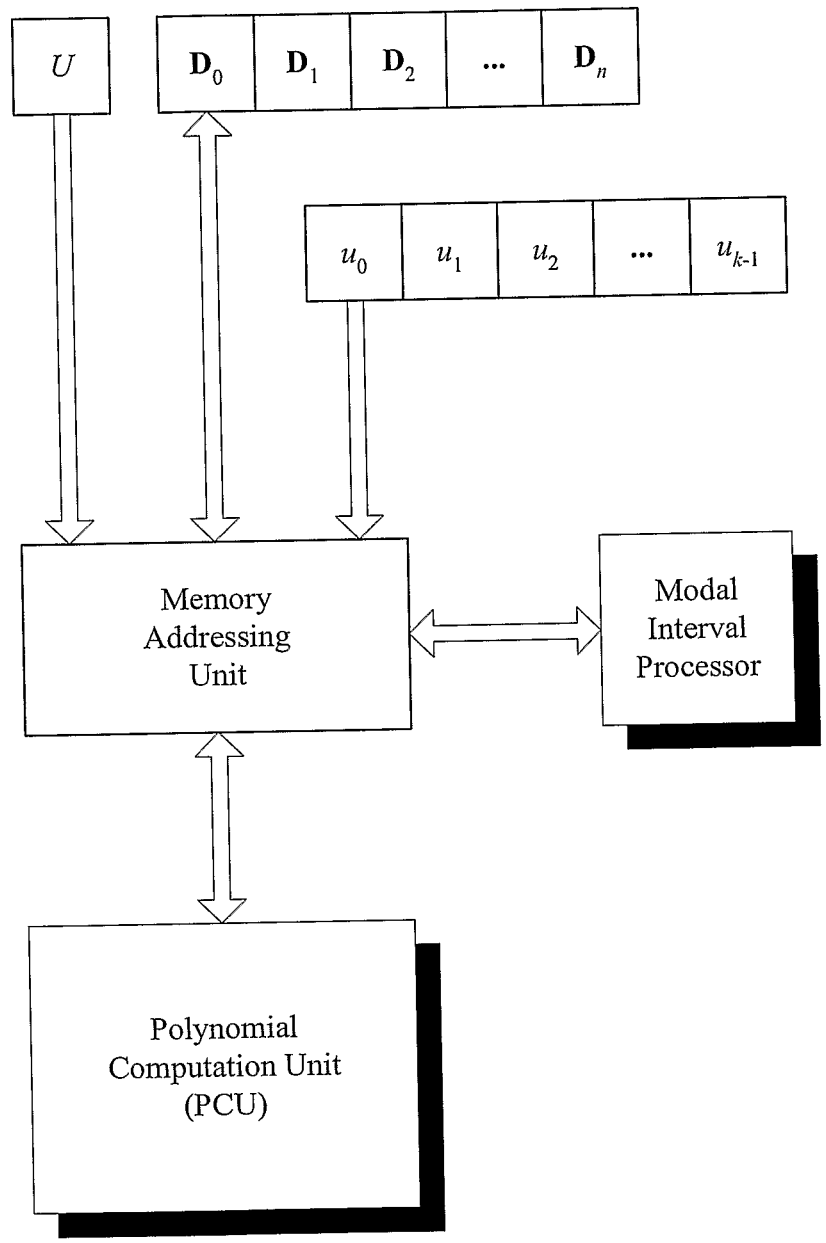
FIG. 8 represents a block diagram of the Polynomial Computation Unit (PCU) of the present invention.

As depicted in FIG. 8, the PCU receives a representation of a modal interval polynomial curve. The representation is comprised of a modal interval function variable and an array of modal interval control points. In the case of a B-spline, the PCU also receives a representation of a knot vector as an array of scalars.

The PCU advantageously works in conjunction with a modal interval processor as described in applicant's previously cited application entitled MODAL INTERVAL PROCESSOR. The PCU evaluates a polynomial by a recursive process of modal interval linear interpolation of the control points. For the computation of each modal interval linear interpolation, the PCU uses the modal interval processor to perform the arithmetical operations on representations of modal intervals. The PCU and the modal interval processor use a representation of modal intervals as described in applicant's previously cited applications entitled REPRESENTATION OF MODAL INTERVALS WITHIN A COMPUTER and RELIABLE AND EFFICIENT COMPUTATION OF MODAL INTERVAL ARITHMETIC OPERATIONS.

A memory addressing unit connects the PCU and the modal interval processor, allowing the PCU to access the representation of the polynomial and to communicate with the modal interval processor. Access to the polynomial representation is read-only except for the array of modal interval control points, into which the PCU stores intermediate results.

Figure 9:
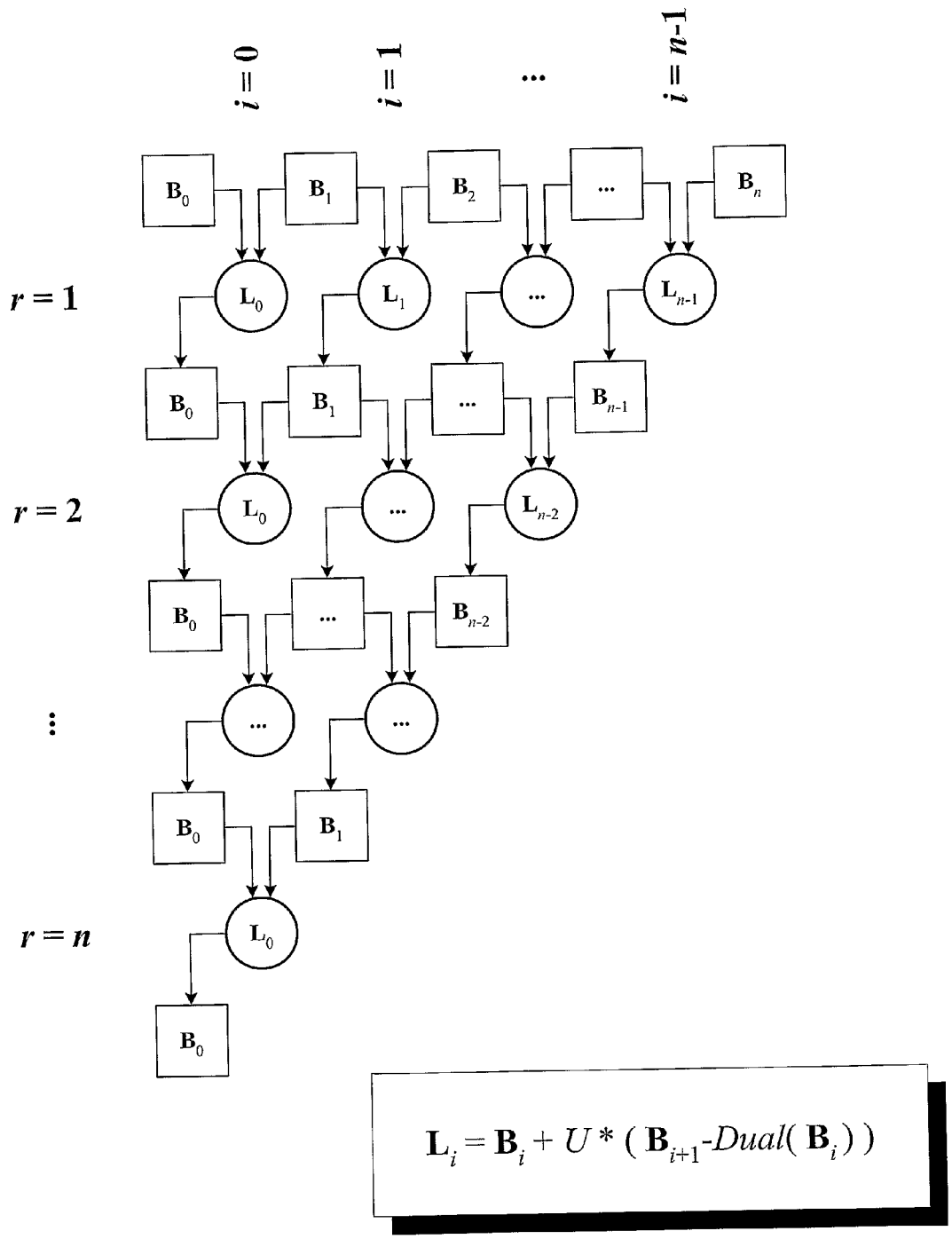
FIG. 9 is a flowchart depicting the operation of a PCU on a representation of a modal interval Bezier curve.

FIG. 9 shows the operation of a PCU on a representation of a modal interval Bezier curve. The representation is comprised of a modal interval function variable, U, and an array of n+1 modal interval control points, $B_0$, $B_1$, $B_2$, ..., $B_n$. The representation of the Bezier curve may reside in a register file, in memory, or in both. In either case, the memory addressing unit allows the PCU to access the representation.

The PCU then begins a recursive process of modal interval linear interpolation of the control points. For each r=1 ... n iteration of the recursive process, i=0 ... n−r elements in the array are overwritten by intermediate results. A first and a second element of the array of control points are linearly interpolated and the result is stored in the location of the first element. Next, the second element is interpolated with a third element and the result is stored in the location of the second element. This process repeats until all adjacent pairs of elements in the array are interpolated. Upon completion, the array is comprised entirely of intermediate results and the size of the array has been reduced by one. Subsequent iterations of the recursive process occur until only a single control point is left in the array. The remaining control point is the modal interval result.

A modal interval linear interpolation operation, $L_i$, occurs for each pair of adjacent elements in the array of control points. The operation receives a representation of the modal interval function variable, U, and a first and a second control point, $B_i$ and $B_{i+1}$, respectively. Then a modal interval processor performs the arithmetical operations $$L_i = B_i + U*(B_{i+1} - \text{Dual}(B_i))$$

on the modal interval operands to compute the result of the modal interval linear interpolation.

Figure 10:
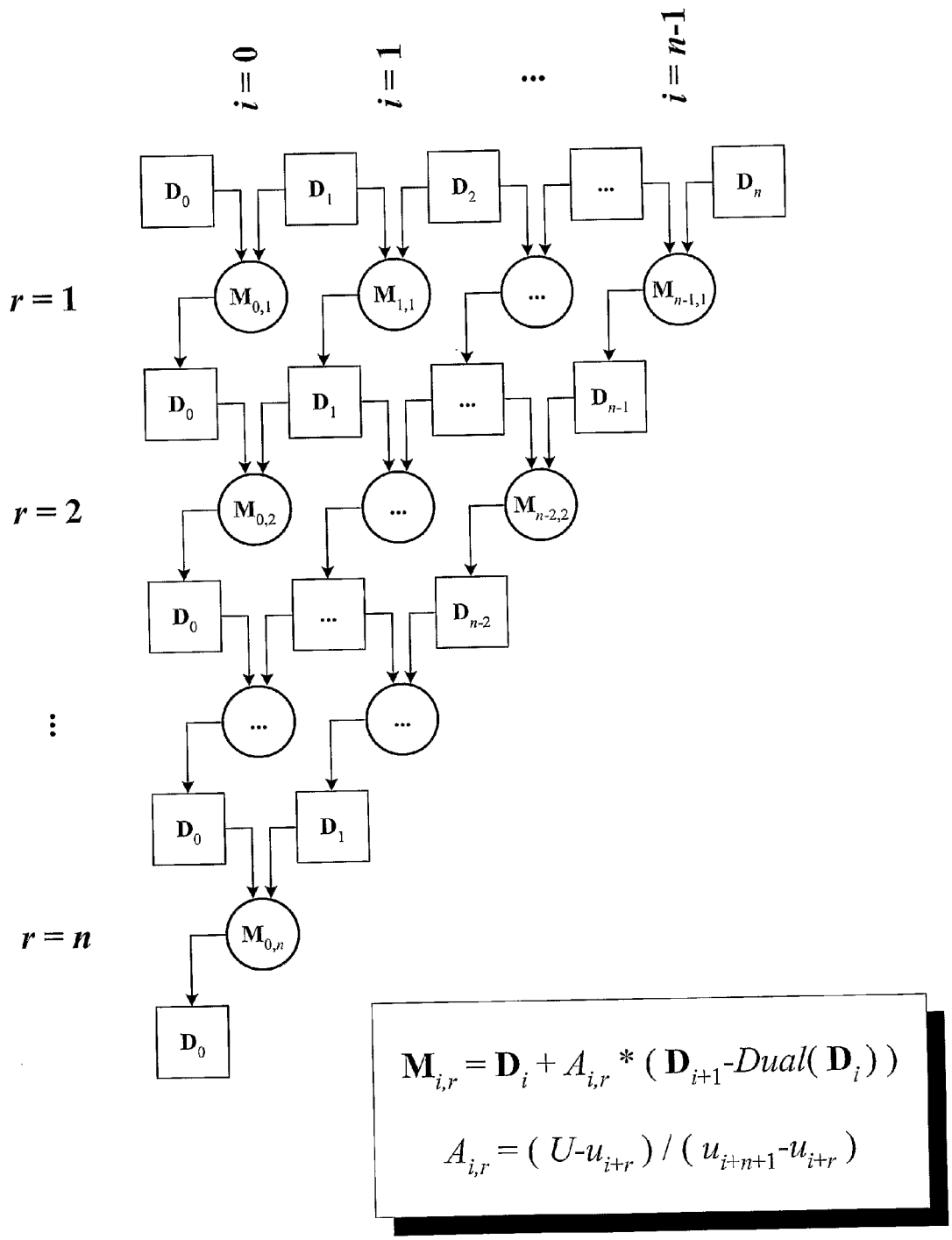
FIG. 10 is a flowchart depicting the operation of a PCU on a representation of a modal interval B-spline curve.

FIG. 10 shows the operation of a PCU on a representation of a modal interval B-spline. The representation is comprised of a modal interval function variable, U, an array of $m=n+1$ modal interval control points, $D_0, D_1, D_2, \ldots, D_n$, and a non-decreasing array of $k=2m$ knots (scalars), $u_0, u_1, u_2, \ldots, u_{k-1}$, such that $u_n \neq u_m$. The representation of the B-spline may reside in a register file, in memory, or in both. In either case, the memory addressing unit allows the PCU to access the representation.

As in the case of a Bezier curve, the PCU begins a recursive process of modal interval linear interpolation of the control points. When only a single control point is left in the array, it is the modal interval result.

A modal interval linear interpolation operation, $M_{i,r}$, occurs for each pair of adjacent elements in the array of control points. The operation receives a representation of the modal interval function variable, U, a first and a second control point, $D_i$ and $D_{i+1}$, respectively, and a first and a second knot value, $u_{i+r}$ and $u_{i+n+1}$. Then a modal interval processor performs the arithmetical operations $$M_{i,r} = D_i + A*(D_{i+1} - \text{Dual}(D_i)),$$

where $$A = \frac{U - u_{i+r}}{u_{i+n+1} - u_{i+r}},$$

on the modal interval operands to compute the result of the modal interval linear interpolation.

CONCLUSION

In as much as the PCU computes bounds on a modal interval Bezier or B-spline curve, the computational machinery of the PCU can be used without modification to evaluate tensor product surfaces, and higher-dimensional geometry of a similar nature. Additionally, only slight modification to the PCU is required to support non-rectangular polynomial surfaces, such as Bezier triangles and S-patches. Support for rational curves and surfaces are likewise contemplated. To wit, the polynomial numerator and denominator are evaluated separately and then divided, or a more geometric method is obtained by performing the division before each linear interpolation operation of the recursive process.

The functionality of the PCU, as well as all the aforementioned variants of the embodiment, can be easily emulated on a general-purpose computational device in the form of a software program. FIG. 11 provides several examples as listings of pseudo-code. The bezier( ) and bspline( ) programs evaluate bounds on Bezier and B-spline curves, respectively. The triangle( ) program shows how the present invention can be easily adapted to provide support for non-rectangular polynomial surfaces, in this case a Bezier triangle.

Figure 12:
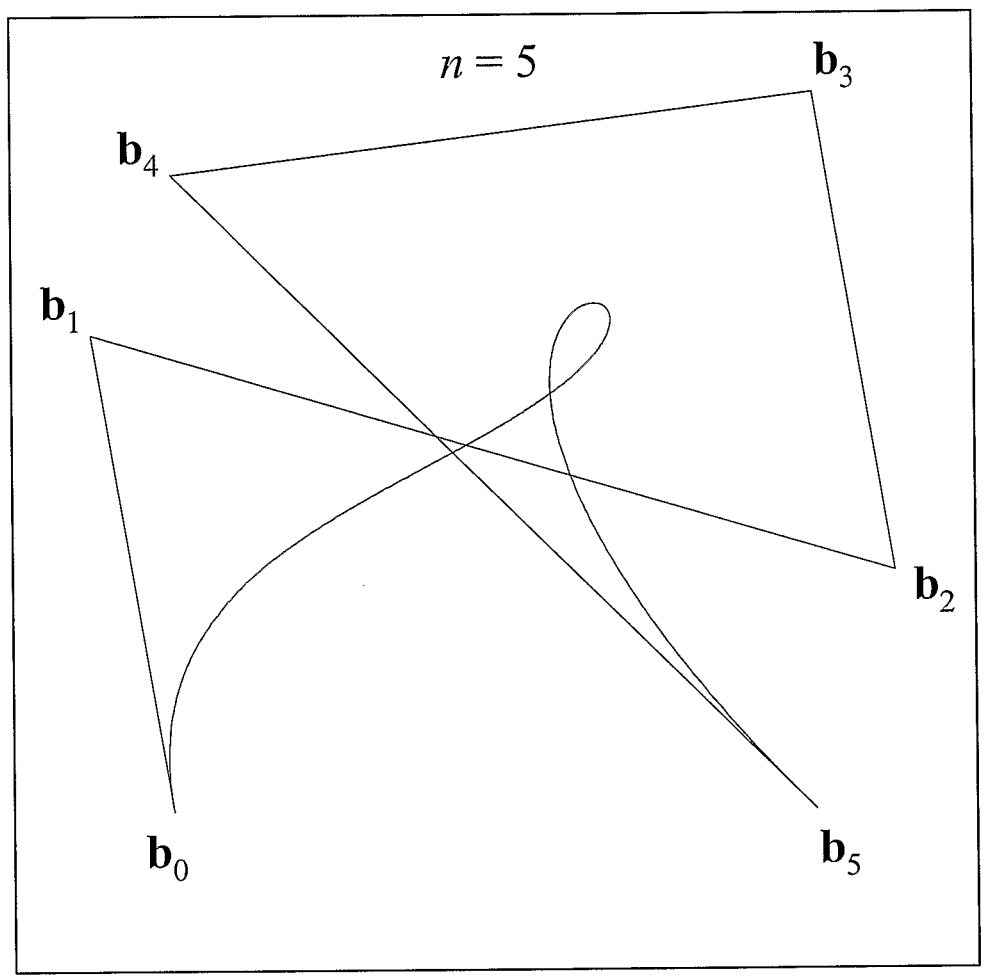
FIG. 12 illustrates a fifth-degree Bezier curve.
Figure 14:
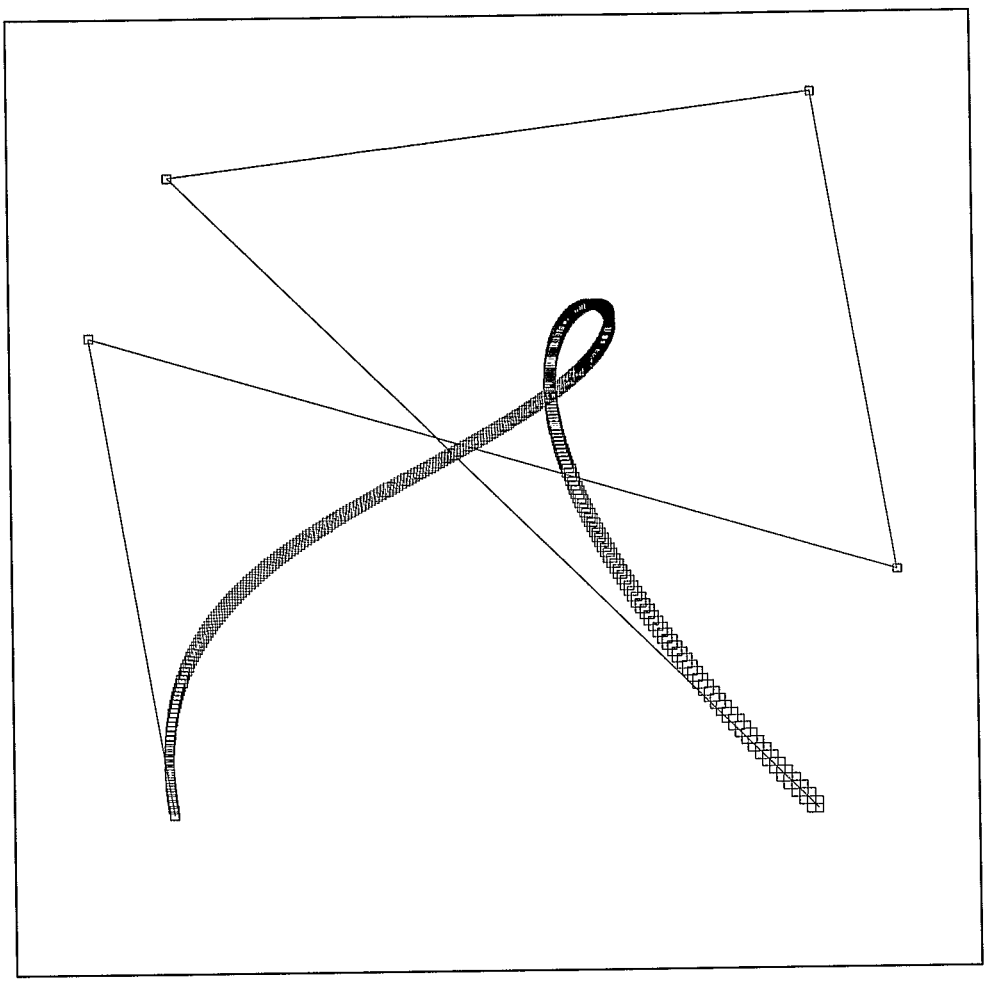

Finally, a comparative assessment of the subject approach is readily appreciated with reference now to FIGS. 12-14. FIG. 12 illustrates a fifth-degree Bezier curve, that is, a Bezier curve where $n=5$. FIG. 13 is a graph of the same polynomial, but it is instead treated as a set-theoretical interval curve, that is, the control points are all set-theoretical intervals. The parameter domain of the function is subdivided into small, equal-width intervals, and each parameter interval is used to perform a recursive sequence of linear interpolations of the interval control points using only set-theoretical arithmetic operators found in the prior art. As can be clearly seen, the interval dependence is so severe that computed bounds are unreasonably pessimistic.

By contrast, FIG. 14 is a graph of a modal interval polynomial computed with the system and method of the present invention. In this case, the parameter domain of the function is similarly divided into small, equal-width modal intervals, and each parameter interval is used to perform a recursive sequence of modal interval linear interpolations of the modal interval control points using the methods of the present invention. Unlike the pessimism in FIG. 13, the pessimism of the interval dependence in FIG. 14 is defeated due to the novel modal interval analysis and computational system and method of the present invention.

There are other variations of this invention which will become obvious to those skilled in the art. It will be understood that this disclosure, in many respects, is only illustrative. Although the various aspects of the present invention have been described with respect to various preferred embodiments thereof, it will be understood that the invention is entitled to protection within the full scope of the appended claims.

What is claimed is:

1. A system for computing narrow bounds on a modal interval polynomial function parameterized by a modal interval function variable U and a control polygon comprising a set of modal interval coefficients $B_0, B_1, \ldots, B_n$, the modal interval function variable U and the modal interval coefficients $B_0, B_1, \ldots, B_n$ being modal intervals delimited by first and second marks of a digital scale, the system comprising:
   a. a hardware circuit for processing a representation of said modal interval polynomial function; and,
   b. a modal interval processor for executing a modal interval linear interpolation, said modal interval processor operatively linked to said hardware circuit via a memory addressing unit, said modal interval linear interpolation comprising modal interval arithmetic operations characterized by said modal interval function variable U and select modal interval coefficients of said modal interval coefficients $B_0, B_1, \ldots, B_n$, operands of said modal interval arithmetic operations of said modal interval linear interpolation each delimited as a modal interval comprising a quantified set of real numbers.

2. The system of claim 1 wherein said modal interval arithmetic operations comprise $B_i + U \cdot (B_{i+1} - \text{Dual}(B_i))$ wherein $B_i$ and $B_{i+1}$ represent modal interval coefficients of said select modal interval coefficients and Dual is an operator which changes a quantifier mode of modal interval coefficient $B_i$.

3. The system of claim 1 wherein said modal interval linear interpolation is characterized by a representation of a knot vector, said representation of the knot vector comprising a sequence of marks of a digital scale.

4. The system of claim 3 wherein said modal interval arithmetic operations comprise $B_i + A(U) \cdot (B_{i+1} - \text{Dual}(B_i))$ wherein $B_i$ and $B_{i+1}$ represent modal interval coefficients of said select modal interval coefficients and wherein $A(U)$ is a modal interval function characterizing U as a function of said knot vector.

5. The system of claim 1 wherein said hardware circuit comprises a polynomial computation unit.

6. The system of claim 5 wherein said modal interval arithmetic operations comprise $B_i+U\cdot(B_{i+1}-\text{Dual }(B_i))$ wherein $B_i$ and $B_{i+1}$ represent modal interval coefficients of said select modal interval coefficients and Dual is an operator which changes a quantifier mode of modal interval coefficient $B_i$.

7. The system of claim 5 wherein said modal interval linear interpolation is characterized by a representation of a knot vector, said representation of the knot vector comprising a sequence of marks of a digital scale.

8. The system of claim 7 wherein said modal interval arithmetic operations comprise $B_i+A(U)\cdot(B_{i+1}-\text{Dual }(B_i))$ wherein $B_i$ and $B_{i+1}$ represent modal interval coefficients of said select modal interval coefficients and wherein A(U) is a modal interval function characterizing U as a function of said knot vector.

9. The system of claim 1 wherein a functionality of said modal interval processor is emulated by a floating-point processor.

10. The system of claim 9 wherein said emulation comprises a sequence of executable machine instructions for said floating-point processor.

11. The system of claim 5 wherein a functionality of said polynomial computation unit is emulated by a general-purpose central processing unit.

12. The system of claim 11 wherein said emulation comprises a sequence of executable machine instructions for said general-purpose central processing unit.

13. The system of claim 1 wherein said set of modal interval coefficients $B_0, B_1, \ldots, B_n$ comprise modal interval vectors, each modal interval vector delimited by a plurality of modal intervals, each modal interval of said plurality of modal intervals delimited by first and second marks of a digital scale.

* * * * *